United States Patent [19]

Boggy et al.

[11] 4,406,542
[45] Sep. 27, 1983

[54] RAPID SCANNING AUTOCORRELATION DETECTOR

[75] Inventors: Richard D. Boggy, Milpitas; Richard H. Johnson, Cupertino; John M. Eggleston, Stanford; Carl W. Schulthess, Mission Viejo, all of Calif.

[73] Assignee: Spectra-Physics, Inc., San Jose, Calif.

[21] Appl. No.: 288,859

[22] Filed: Jul. 31, 1981

[51] Int. Cl.³ .............................................. G01B 9/02
[52] U.S. Cl. ..................................... 356/345; 356/121
[58] Field of Search ............... 356/121, 345, 351, 360, 356/357; 364/822

[56] References Cited

U.S. PATENT DOCUMENTS

| | | | |
|---|---|---|---|
| 3,170,982 | 2/1965 | Hemstreet et al. | 356/360 |
| 3,520,616 | 7/1970 | Glenn et al. | 364/822 |
| 3,675,985 | 7/1972 | Gloge | 364/822 |
| 4,190,366 | 2/1980 | Doyle | 356/346 |

OTHER PUBLICATIONS

Ishida et al., "Rapid-Scan Autocorrelator for Monitoring CW Mode-Locked Dye Laser Pulses", Japanese Jr. of App. Physics, 6-1980, pp. L289-L292.
Crane et al., "A Dispersive Phase Shifter for Use in Nonlinear Optical Interference Experiments", J. App. Phys. 1-1979, pp. 47-48.
Fork et al., "Real-Time Intensity Autocorrelation Interferometer", App. Optics, 11-1978, pp. 3534-3535.

Primary Examiner—William H. Punter
Attorney, Agent, or Firm—Donald C. Feix

[57] ABSTRACT

Autocorrelation traces of laser pulses of short duration are produced by a method and apparatus that uses a rotating glass block to vary the path length on a time scale rapid enough to display the traces on a synchronized oscilloscope. Both paths of a split input beam of a laser pulse pass through the glass block. Rotation of the glass block changes the relative time of travel for light pulses along the two paths. The paths of the two beam arms pass through the block from different directions at a relative angle chosen so that the relative travel time difference is nearly linearly related to the angular position of the block during its rotation.

Autocorrelation with rapid scanning through rotation of the block enables measurement of repetitive laser light pulses of very short duration, down to the order of one picosecond. An oscilloscope display of the autocorrelation traces allows the user to make laser adjustments while continuously monitoring the pulse correlation function so that the laser can be tuned in real time to produce ultra-short pulses.

20 Claims, 7 Drawing Figures

FIG. 7 VARIATION IN PATH LENGTH AS A FUNCTION OF ANGLE BOTH LEGS TRAVELING THROUGH BLOCK

RAPID SCANNING AUTOCORRELATION DETECTOR

BACKGROUND OF THE INVENTION

The invention relates to an autocorrelator for connection to a pulsed laser for generating a display signal which enables the laser to be tuned in real time (with reference to a display of the display signal) down to the order of one picosecond pulse width. The invention also encompasses a method of producing autocorrelation traces.

The prior art techniques for the tuning of a pulsed laser for very short pulse widths was difficult because of the lack of efficient instrumentation and methods for tuning the laser in real time, i.e., with simultaneous display of the traces for reference in making tuning adjustments.

A trial-and-error procedure was generally used for tuning a pulsed laser for operation with pulse widths in the range of one to 100 picosecond. The laser was connected to a strip chart recorder, and a three to five minute long delay in readout on the recorder was often required. Tuning adjustments to the laser were made after the strip recorder printout was analyzed. The procedure was then repeated until the strip recorder finally indicated the desired result.

U.S. Pat. No. 4,190,366 to Doyle discloses an interferometer having a moving refractive element in one arm for scanning. The moving refractive element is a glass wedge which presents a greater or lesser thickness of glass for a light beam to pass through. The Doyle patent interferometer has the refractive element in one arm only, and motion of the element is reciprocal linear. Both of those features differ from the present invention.

The autocorrelator system of the present invention does not use an interference effect, as does the Doyle interferometer, and the refractive element of the present invention is used as a variable pulse time delay rather than as a variable phase shift.

Other prior art interferometers have used the well known linear motion of a mirror in one of the two split beam paths.

An article entitled "Real-Time Intensity Autocorrelation Interferometers", by R. L. Fork and F. A. Beisser, published in *Applied Optics*, Vol. 17, No. 22, pp. 3534-35, Nov. 15, 1979, describes an autocorrelator for obtaining real time performance by varying the path length of one interferometer arm. The path length is varied at audio frequencies by an oscillating glass corner cube mounted on the armature of a shaker device. A display of the temporal shape of pulses of one picosecond and less is obtained by a phase-matched sum frequency generation in a KDP crystal. The apparatus described in the article provides for calibration of the real time display by using a stepping motor to adjust the path length by a known distance.

SUMMARY OF THE PRESENT INVENTION

It is an object of this invention to improve on prior interferometer and autocorrelator apparatus through methods and apparatus which enable contemporaneous monitoring of an autocorrelation trace during fine tuning of a pulsed laser for very short pulse widths, utilizing a simple and improved variable beam delay apparatus.

The autocorrelator apparatus and method of the present invention enable tuning of a pulsed laser in real time, down to a pulse width of one picosecond or less. The system is capable of displaying the trace of an autocorrelation function on any high impedance oscilloscope for continous monitoring of pulse characteristics while fine-tuning laser performance. By scanning the relative delay between the two paths of a split beam in a Michelson arrangement the autocorrelator uses the light to measure itself.

The autocorrelator utilizes a polarized input beam and a means for splitting the beam into first and second separate beams. A rotating, light-transmitting, refractive block is positioned in the paths of both beams which strike the block at a fixed angle relative to each other but at varying angles to the block faces. Light travels more slowly through the block than through air; and the greater the thickness of block to penetrate, the greater the delay. The relative travel time of the two beams is thus varied as the block rotates, and the approach angles of the two beams are chosen so that the relative travel time of the beams is nearly linearly related to the angle of rotation of the block over the scan range.

The time-delayed beams are then reflected into a device for detecting the difference in travel time between the beams. This may be accomplished with a non-linear crystal which receives the two beams and transmits an output whose intensity varies in response to the amount of overlap of the pulses from the first and second beams. Output intensity is measured for use in displaying the function on an oscilloscope.

The input beam into the autocorrelator is vertically polarized so that light transmission factors at the surfaces of the refractive block (e.g., glass) do not adversely affect the autocorrelation function. The tranmission factors change with the angle the beam makes with the glass surfaces. Since it is desired to obtain a relatively flat response of beam intensity versus rotational position of the block, it is important that the light be properly polarized to eliminate any significant reflection/transmission factors at the surfaces of the block. It is also important that both beams pass through the block so that both pass through the same surfaces.

Because both beams in the present invention go through the rotating block (rather than just one beam as in prior art linear-driven devices) a substantially linear relative delay of the two beam arms is produced during rotation of the block. If only one beam passed through the block, the response would be nonlinear; and the proper calibration of the autocorrelation trace on an oscilloscope (which has a uniform rate of sweep in the horizontal direction) would not be possible.

Each beam as it passes through the rotating block encounters a delay which plots as a curve against time. However, the net effect of the two beam delays (i.e., the relative subtractive delay of the two beams) is nearly linear—assuming the beams are properly oriented.

The two beams are ultimately directed into a nonlinear, frequency doubling crystal which transmits an output whose intensity varies in response to the degree of overlap of the pulses from the two separate beams. If there is no overlap at all, i.e., if the waves of the two beams cancel out, there is no output from the nonlinear crystal. Partial overlap produces some output, and maximum output is realized when there is no delay, with the two waves reinforcing each other. Under that condition peak intensity is produced and the nonlinear crystal produces a doubled-frequency, halved-wavelength ultraviolet output from the two beam inputs.

The output of the nonlinear crystal is sensed by a photomultiplier tube and is connected to an oscilloscope for display. The oscilloscope displays intensity versus time.

The time base on the oscilloscope must be converted to time base in autocorrelation space. In a preferred embodiment, the conversion factor is 15 picoseconds in autocorrelation space per millisecond on the oscilloscope. This depends upon the speed of rotation of the block and the thickness of the block.

The thickness of the block is selected in accordance with the size range of the pulse durations to be monitored. Thicker blocks are used for pulses of larger width or duration, while thinner blocks are used for shorter duration pulses.

The rate of rotation of the refractive block is fixed, and it may rotate at 30 cycles per second. This corresponds to 60 hertz repetition of the relative delay scan, since the block has two identical sides. The ends of the block are frosted or opaqued to prevent transmission except during the relative delay scan.

To check the calibration of the oscilloscope, a fixed, known delay is put into one beam or arm of the autocorrelator; and the resulting shift in the scope trace is observed. When the fixed delay is a known quantity, the scope can be calibrated.

It is an important object of the present invention to pass the two arms of a split beam through a single rotating block simultaneously to produce a substantially linear relative delay response and to rotate the block at a speed which permits the traces to be displayed on a synchronized oscilloscope in real time. This facilitates fine tuning of the pulsed input beam for very short pulse widths.

Rotating block autocorrelator apparatus and methods which incorporate the structure and techniques described above and which are effective to function as described above constitute further, specific objects of this invention.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

DESCRIPTION OF THE DRAWINGS

FIG. 7 is a graph depicting first the variation in path length or delay of each beam individually due to passage through the rotating glass block, and then the subtractive or relative delay between the two beams, as a function of the angular position of the block.

DETAILED DESCRIPTION OF A PREFERRED EMBODIMENT

Figure 1:
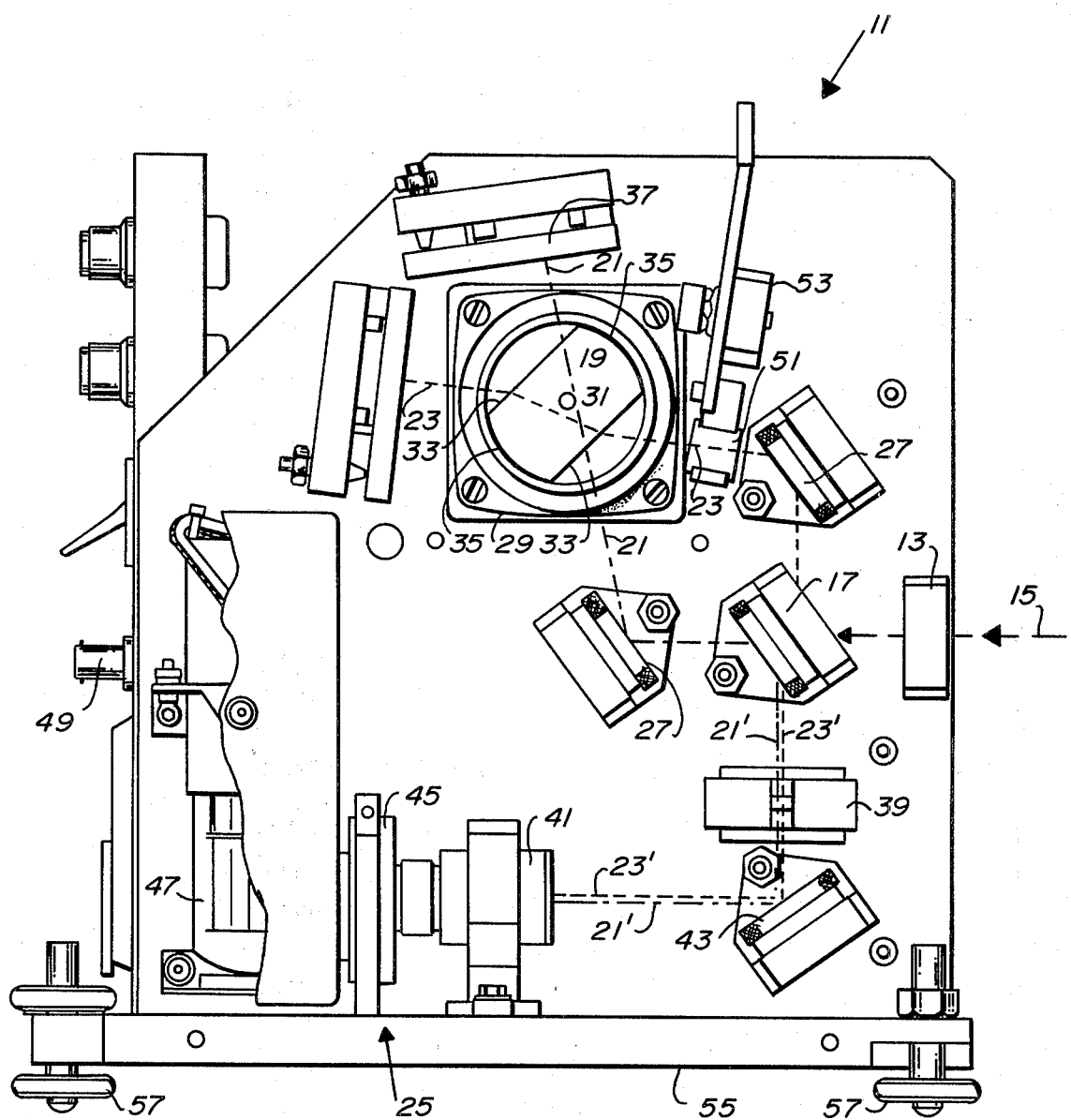
FIG. 1 is a partially schematic elevation view of a rapid scanning autocorrelator constructed in accordance with one embodiment of the present invention.
Figure 2:
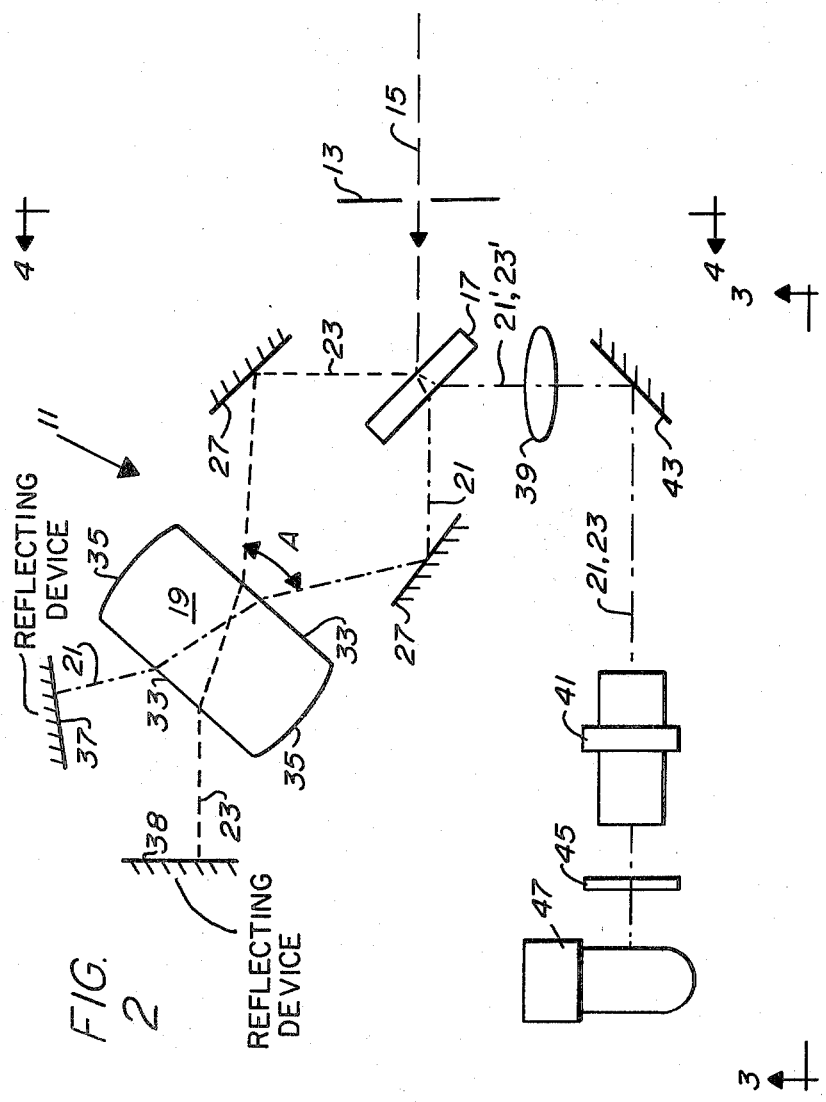
FIG. 2 is a schematic representation of the autocorrelator of FIG. 1, showing the paths of light beams as they are split from an input beam and refracted and reflected to detection apparatus.

A rapid scanning autocorrelator system constructed in accordance with one embodiment of the present invention is indicated generally by the reference numeral 11 in FIG. 1 and also in the schematic view of FIG. 2.

The system 11 includes an alignment window 13 for receiving an input beam 15 in proper orientation, a beam splitter 17, and a rotating refractive block 19 preferably of fused silica (glass) for affecting simultaneously the path lengths of both the first and second beams 21 and 23. The beams are ultimately directed to autocorrelator detection apparatus 25 which produces an intensity signal which, when connected to an oscilloscope (not shown), is capable of displaying the autocorrelation function in real time.

The input beam striking the beam splitter 17, of conventional construction, is partially transmitted as the first beam 21 and partially reflected as the second beam 23. These two beams are reflected by mirrors 27 toward the rotating block 19, as indicated in FIGS. 1 and 2. The block is rotationally driven by an AC-synchronous motor 29, producing a reliably constant rate of rotation about an axis 31.

The block 19 has two opposed flat faces 33 which pass the light beams and a pair of frosted or otherwise opaqued ends 35 which interrupt the travel of the beams. The two beams are oriented at an optimum angle with respect to each other as they approach the block 19, preferably about 70° and more specifically, about 72°. This produces a substantially linear response of relative delay as a function of the angular position of the block (or as a function of time), as depicted in FIG. 7 and as described in more detail below.

Path length (or delay) variation is effected by variation in thickness of block traversed by each beam due to the angle of the block, and by the corresponding change in the length that the beam travels through air. Light travels more slowly through glass; beam delay is least when a beam enters and leaves the glass block at 90°, and greatest when it travels through the glass most obliquely.

The beams 21 and 23 emerging from the block 19 strike reflecting device 37 and reflecting device 38, which may be simple mirrors but preferably comprise retro-reflecting prisms, as explained below. From there the beams 21' and 23' are reflected back through the block 19 and off the mirrors 27 back to the beamsplitter 17, generally along the same path as before but somewhat offset due to the use of the retro-reflectors 37 and 38.

As in a conventional interferometer, the returning beams 21' and 23' run parallel as they leave the beamsplitter, but separated somewhat due to preferred positioning of the retro-reflectors 37 and 38, the beam 21' being reflected (partially) and the beam 23' being transmitted (partially). Spaced apart slightly as indicated in FIG. 1, they pass through a convex lens 39 which converges them toward a frequency-doubling crystal 41; and this may be via a mirror 43 for compactness of the system 11.

The frequency doubling crystal is a non-linear crystal which produces frequency-doubled, ultraviolet components from the beams 21' and 23', a function which is well known and was used, for example, in the autocorrelator disclosed in the *Applied Optics* article referenced above. If there is no overlap between the two beams, i.e., their wave patterns cancel, there will be no output from the nonlinear crystal. The intensity of the output depends on the degree of overlap, and zero delay between the beams produces peak intensity. An ultraviolet-pass filter 45 filters out all but the ultraviolet output, which is then sensed by a photomultiplier tube 47.

The resulting signal from the photomultiplier tube 47, output via a terminal 49, may be input to an oscilloscope (not shown) and displayed, with intensity on the vertical axis against time on the horizontal axis. There is a time base conversion from autocorrelation space to the oscilloscope, and this may be, for example, 15 picoseconds per millisecond on the oscilloscope. The conversion factor varies if the input current frequency varies, and the 15 picosecond/millisecond factor is given as an example for 60 Hz current as is used in the United States.

The calibration of the scope may be checked by putting a fixed, known delay into one of the beam paths, and checking the trace on the scope to see how much shift occurs. Since the fixed delay is known, the scope can be calibrated. A fixed-delay calibration device 51 is shown in FIG. 1. It preferably consists of a glass element or etalon which may be interjected into the path of the beam 23 or retracted from it by a driving unit 53.

The autocorrelator apparatus 11 is mounted on a frame or housing 55 as indicated in FIG. 1. It may be in vertical orientation, with FIG. 1 being a side elevation view, and leveling legs 57 may be included at the bottom for leveling the system 11 relative to an input beam 15.

For proper function of the system 11, the input beam 15 is polarized. Polarization is in the plane parallel to the plane in which the split beams 21 and 23 lie, i.e., vertical polarization if the unit is oriented vertically as described above. This eliminates adverse effects of surface transmission factors at the glass block, as discussed previously.

Figure 4:
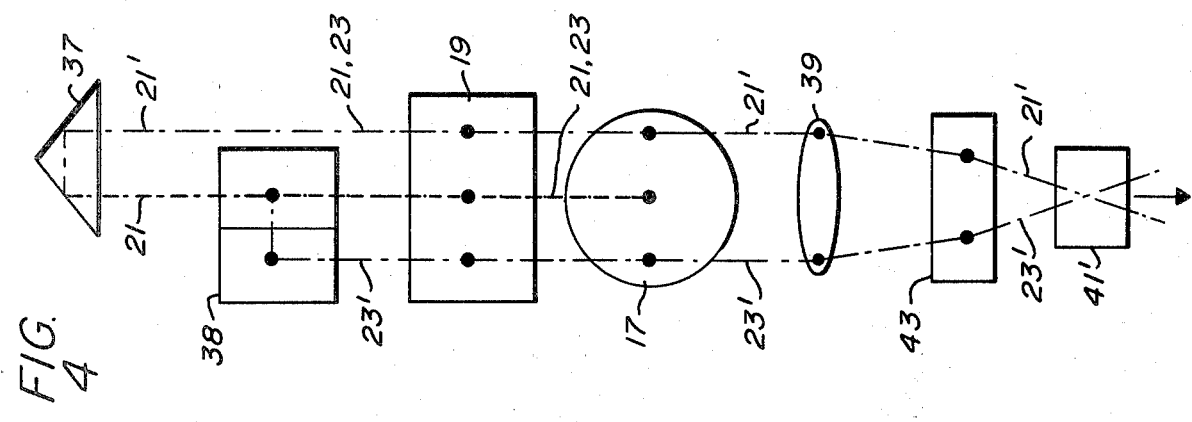
FIG. 4 is a diagramatic representation, taken generally along the line and in the direction indicated by the arrows 4—4 in FIG. 2, showing the offset of beam positions due to the use of retro-reflecting prisms rather than ordinary mirrors.
Figure 3:
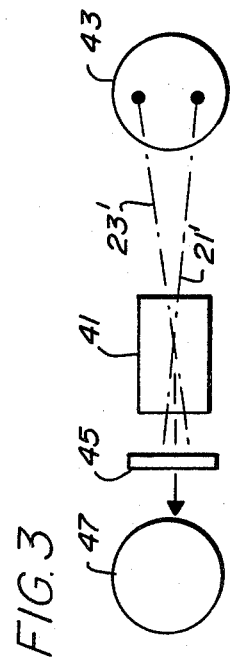
FIG. 3 is a schematic view of the autocorrelator system depicted in FIGS. 1 and 2, as viewed along the line and in the direction indicated by the arrows 3—3 in FIG. 2.

FIGS. 3 and 4 relate to the use of retro-reflective prisms 37 and 38 in the system 11 to produce an offset between the beam paths travelling in opposite directions. Both these views are rough schematics to show the beam offsets and the manner in which inteference between the beams is avoided.

In FIG. 3 the mirror 43 is shown reflecting the two returning beams 21' and 23' from offset positions toward convergence (by the lens 39, FIGS. 2 and 4) in the nonlinear crystal 41.

In FIG. 4, both beams 21, 23 are represented as a simple line leaving the beamsplitter 17 and passing through the rotating block 19. The beam 23 strikes the retro-reflector 38, while the beam 21 strikes the retro-reflector 37. Both retro-reflectors reflect the beams back at an offset from the approaching beam, as the return beams 21' and 23', which pass back through the block 19 offset from the approaching beams 21 and 23. The beam 21' is reflected from the beamsplitter 17, while the beam 23' is transmitted through it, both beams being depicted as straight lines at that point in the schematic diagram of FIG. 4. The offset here avoids feedback of either return beam into the beam generator.

The lens 39 converges the beams 21' and 23', which are then reflected off the mirror 43 to focus in the nonlinear crystal 41.

As indicated in FIG. 4 by the lines of convergence of the two beams 21' and 23', the mirror 43 can be concave to add to the convergence, if desired, although the lens 39 can simply be made more convex, with the mirror 43 planar, to accomplish this same purpose.

The offset of the return beams 21' and 23' provides a means of separating the two beams so that the focusing lens 39 directs the beams into the nonlinear crystal at different angles. This then separates the normal frequency doubled output obtained from a nonlinear crystal as a response to a single beam, from the response needed to display the frequency doubling resulting from overlap of two beams. The background free sum frequency generation proportional to the product of the two beam intensities is detected at an angle bisecting the angle between the two beams.

Figure 5:
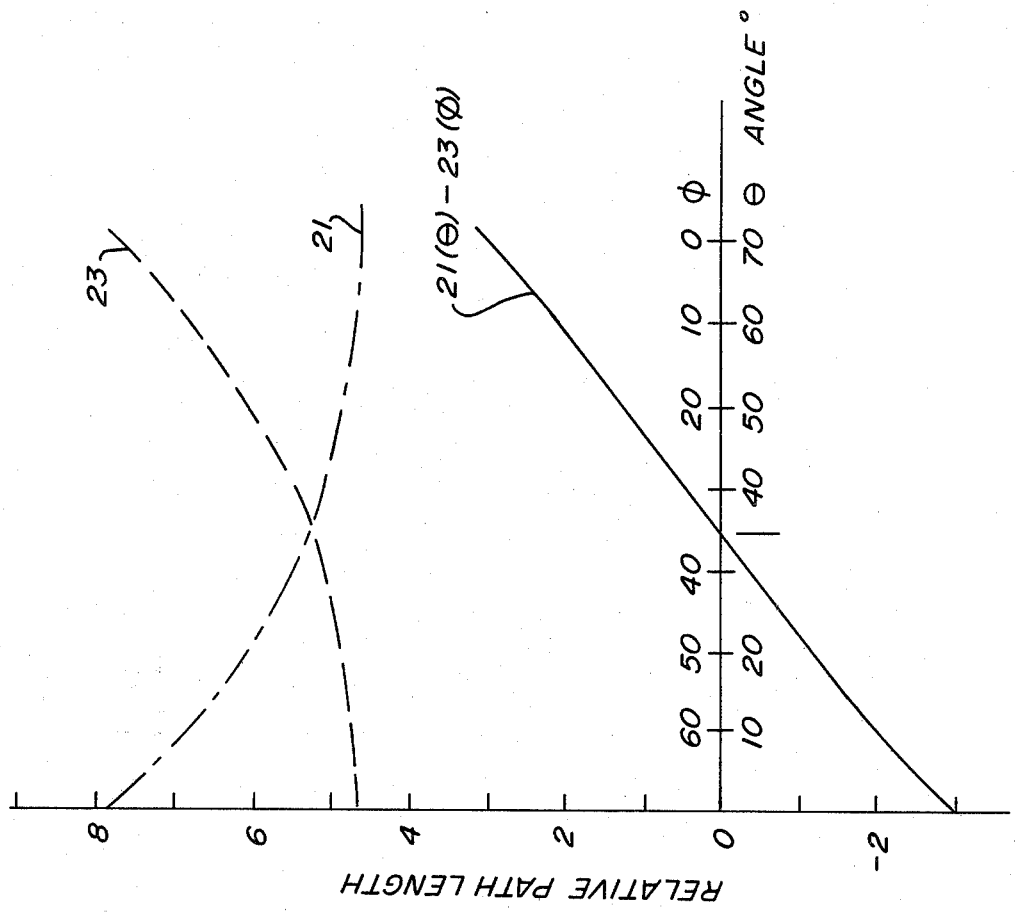
FIG. 5 is a schematic diagram demonstrating the delay effect caused by the travel of the two beams through a rotating glass block, in one position of rotation of the block.
Figure 5:
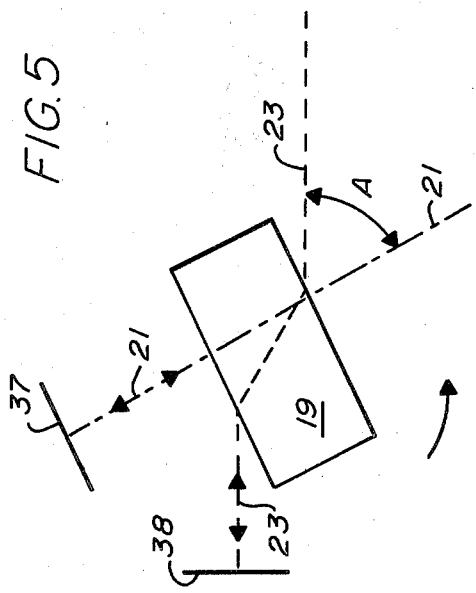
Figure 6:
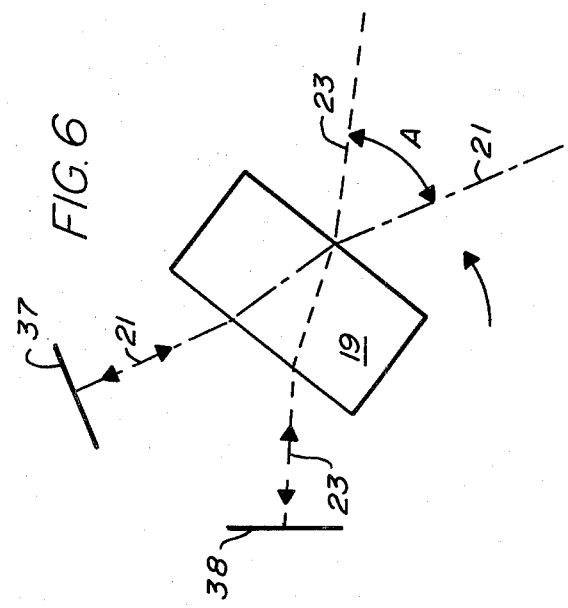
FIG. 6 is a schematic diagram similar to FIG. 5, but with the glass block in another position of rotation.

FIGS. 5, 6 and 7 show the effect of the rotating block on the two beams. Preferably, these beams 21 and 23 approach the block 19 at a fixed angle A (FIGS. 5, 6 and 2) of about 72° relative to each other, in this specific embodiment. This helps produce a linear response of relative beam delay versus time (or angular rotation), as explained below with reference to FIG. 7.

FIG. 5 shows the beam 21 passing straight through the block 19, perpendicular to its faces 33, so that delay is at a minimum in this beam. This preferably is where the scan of relative delay commences—at the point where one beam is perpendicular—and it ends at the point where the other beam is perpendicular, at its minimum delay.

At the same time the beam 21 is at its minimum delay as shown in FIG. 5, the beam 23 is at the maximum delay in the scan, i.e., at the most oblique angle. At this block position, the block can be considered to be at the origin of the particular scan underway, at 0° in a scan of 0° to 72° (preferably) of block rotation. In this position the relative delay between the beams is at maximum, as depicted in the lower curve (nearly straight line plot) of the FIG. 7 graph.

In FIG. 6 the block is midway in the scan, with its faces at the same angle to both beams. At this point the relative delay between the beams is zero, assuming, as is preferred, the total remaining components of the two path lengths are equal to each other. This is where the lower curve in FIG. 7 crosses the horizontal axis or zero point.

As the block progresses to the end of the scan shown in FIGS. 5 and 6, it moves toward a position opposite that shown in FIG. 5, i.e., with the beam 23 perpendicular to the block and the beam 21 at the most oblique angle. The relative delay is again at maximum, but in the other direction, as shown at the upper right end of the lower curve of FIG. 7.

FIG. 7 is a plot of path lengths of the two beams, first individually and then subtracted, giving the relative variation in pathlength. The relative variation function is nearly a straight line in the preferred embodiment, due to both beams passing through the block and their being at the preferred angle relative to each other. When the curve of the beam 23 delay is subtracted from the curve of the beam 21 pathlength, the nearly linear function, relative delay, results. The linear response, as noted above, permits display on an oscilloscope having a uniform rate of horizontal sweep.

A polarization rotator (not shown in the drawings) can be used between the beam splitter 17 and the lens 39 when a particular crystal 41 is used which requires a different input polarization.

While we have illustrated and described the preferred embodiments of my invention, it is to be understood that these are capable of variation and modification, and we therefore do not wish to be limited to the precise details set forth, but desire to avail myself of such changes and alterations as fall within the purview of the following claims.

We claim:

1. A method of producing autocorrelation traces of laser pulses of short duration, said method comprising,
   splitting an input beam of pulsed laser light into first and second separate beams,
   positioning a rotatable refractive, light transmissive block in the paths of the first and second separate beams, so that the beams enter the block through one face and exit through the opposite face,
   rotating the block to change the angle at which the beams pass through the block to thereby change the travel time of the beams,
   detecting the difference in travel time between the first and second beams by a nonlinear crystal which transmits an output whose intensity varies in response to the amount of overlap of the pulses from the first and second separate beams, and
   measuring the intensity of the output of the nonlinear crystal for use in display on an oscilloscope.

2. The invention defined in claim 1 wherein the pulses have durations of less than 1 pico second to about 50 pico seconds and including the step of locating the block symmetrically with respect to the first and second beams.

3. The invention defined in claim 1 wherein the first and second beams are oriented at an angle of about 72° relative to each other as they approach the block.

4. The invention defined in claim 1 wherein the detecting step includes repeatedly scanning the two beams through an angle of about 72° of block rotation, each scan commencing with one of the beams perpendicular to the block faces and the other at an oblique angle, and terminating with the other beam perpendicular to the block faces and the one beam at said oblique angle.

5. The invention defined in claim 1 wherein the first and second faces of the block are parallel and wherein the block has two end sections which are ground glass for blocking any transmission of the beams through the ends of the block.

6. The invention defined in claim 1 wherein the thickness of the block is selected for the size range of the pulse durations to be monitored with thicker blocks being used for monitoring larger width pulses and thinner blocks being used for monitoring shorter duration pulses.

7. The invention defined in claim 1 including obtaining a relatively flat response from the nonlinear crystal of intensity versus angle of block rotation by insuring that both beams pass through the block at a fixed and preselected angle relative to each other.

8. The invention defined in claim 1 including using a calibrating etalon in the correlator in the path of one of the beams for producing a known time shift in that beam's travel to facilitate calibration of an oscilloscope used for displaying beam delay response.

9. The invention defined in claim 8 including removing the calibrating etalon from the beam path during normal operation of the autocorrelator.

10. The invention defined in claim 1 wherein the input beam is polarized in the plane in which the first and second beams generally lie, to eliminate adverse effects of surface transmission factors.

11. The invention defined in claim 1 wherein the first and second beams are reflected back through the rotating block and ultimately into the nonlinear crystal.

12. The invention defined in claim 1 wherein the reflected beams traveling toward the nonlinear crystal are offset from each other, traveling parallel, then are focused into the nonlinear crystal.

13. The invention defined in claim 11 wherein the beams are reflected back through the block by retro-reflecting prisms to produce an offset in the return beam paths.

14. Rapid scanning autocorrelator apparatus for scanning relative delay of two components of a split light beam, comprising,
    a beamsplitter for partially transmitting an input beam and partially reflecting the input beam to form first and second beams traveling in different directions;
    a refractive block having two opposed faces positioned to receive the first and second beams, and means for rotating the block at a constant rate of rotation;
    beam directing means for directing the first and second beams into and through the block at a preselected angle relative to each other, so that each beam encounters a varying delay in passing through the rotating refractive block and there is a varying relative delay between the two beams as the block rotates; and
    means for detecting the varying relative delay of the two beams and for providing a signal for display of a time-based function corresponding to relative beam delay.

15. The invention defined in claim 14 wherein the detecting means includes reflector means for passing the first and second beams, after they have passed through the block, back through the block and to the beamsplitter, such that the first beam is reflected by the beamsplitter and the second beam is transmitted by the beamsplitter in parallel paths away from the beamsplitter, and further including a nonlinear crystal in the path of the two parallel beams, means for focusing the beams to intersect in the nonlinear crystal, and means associated with the nonlinear crystal for converting relative beam delay into said display signal as an intensity function representing the degree of overlap of the two beams.

16. The invention defined in claim 15, wherein the reflector means includes a retro-reflecting prism in each of the first and second beam paths, for offsetting the returning beams.

17. The invention defined in claim 14, further including means for interposing a fixed, known delay in one of the first and second beams when desired for calibration of an oscilloscope to which said signal may be input.

18. The invention defined in claim 17, wherein the fixed delay interposing means includes a glass etalon and means for interjecting it into and withdrawing it from one beam path.

19. The invention defined in claim 14, wherein the preselected angle is selected to produce as near a linear response of relative beam delay versus block rotation as is possible.

20. The invention defined in claim 19, wherein the preselected angle is about 72°.

* * * * *